H. G. THOMPSON & B. F. BERGH.
Tack-Driving Machines for Boots and Shoes.

No. 156,047. Patented Oct. 20, 1874.

5 Sheets--Sheet 3.

H. G. THOMPSON & B. F. BERGH.
Tack-Driving Machines for Boots and Shoes.

No. 156,047. Patented Oct. 20, 1874.

Witnesses:
Henry N. Miller
N. H. DuHamel

Inventor:
H. G. Thompson
B. F. Bergh
Per H. G. Abbot
Attorney.

5 Sheets--Sheet 4.
H. G. THOMPSON & B. F. BERGH.
Tack-Driving Machines for Boots and Shoes.
No. 156,047.   Patented Oct. 20, 1874.
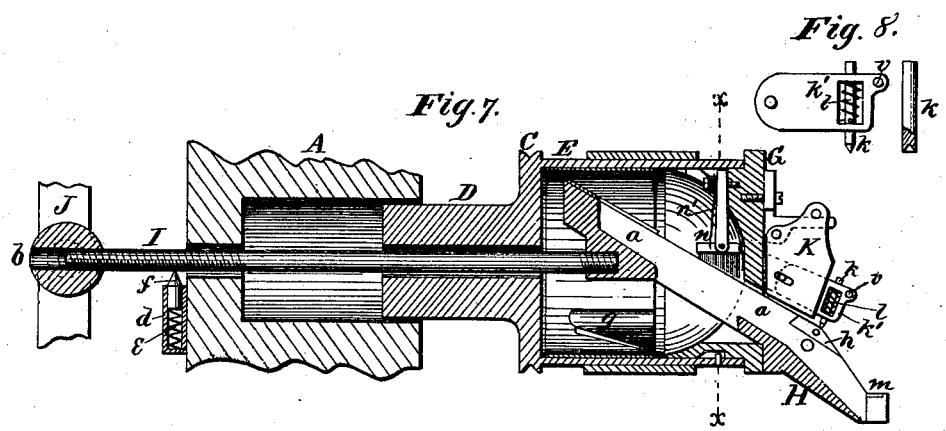
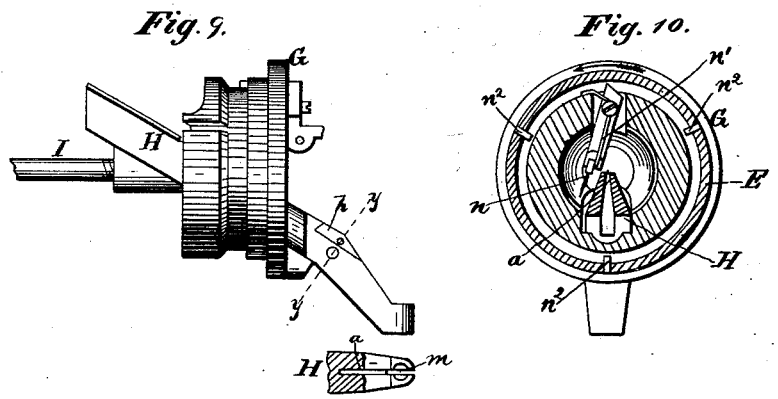
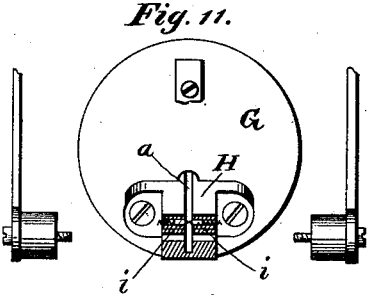
Witnesses:   Inventor H. G. THOMPSON & B. F. BERGH.
Tack-Driving Machines for Boots and Shoes.
No. 156,047. Patented Oct. 20, 1874.
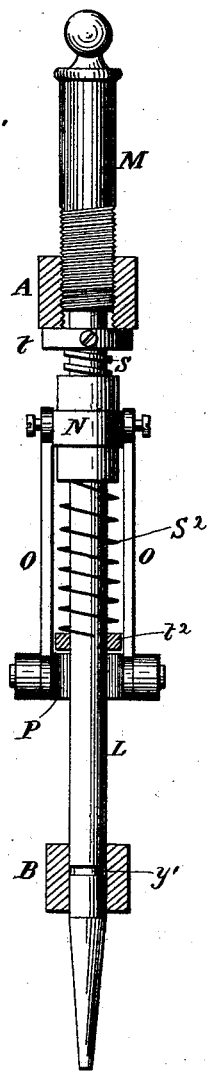
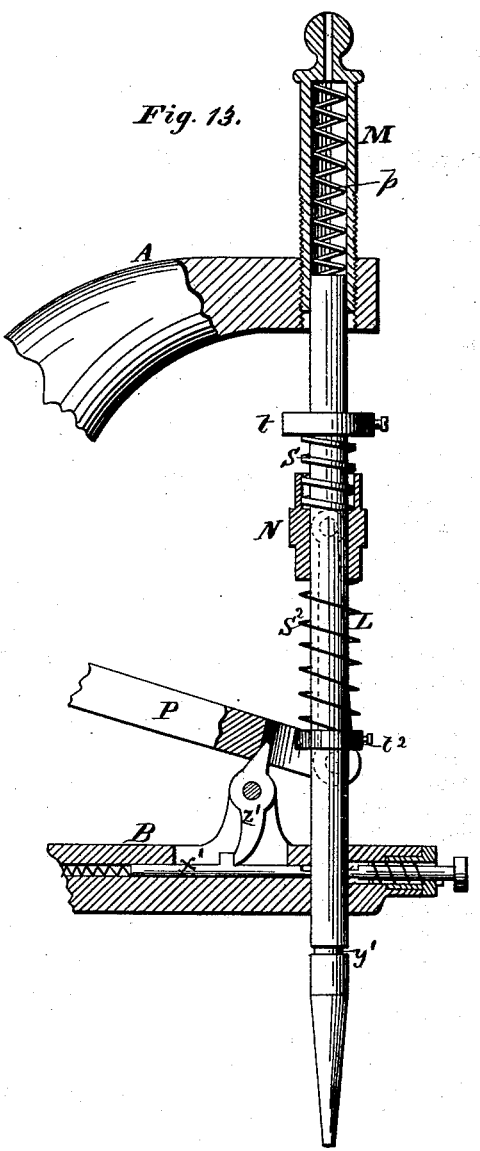

UNITED STATES PATENT OFFICE.

HENRY G. THOMPSON AND BROR F. BERGH, OF MILFORD, CONNECTICUT; SAID BERGH ASSIGNOR OF ALL HIS RIGHT TO SAID THOMPSON.

IMPROVEMENT IN TACK-DRIVING MACHINES FOR BOOTS AND SHOES.

Specification forming part of Letters Patent No. 156,047, dated October 20, 1874; application filed July 2, 1874.

*To all whom it may concern:*

Be it known that we, H. G. THOMPSON and B. F. BERGH, of Milford, county of New Haven and State of Connecticut, have invented certain new and useful Improvements in Tack-Driving Machine for Boots and Shoes, of which the following is a specification:

The nature of our invention consists in the construction and arrangement of a tack-driving machine for boots and shoes and other purposes, as will be hereinafter more fully set forth.

In order to enable others skilled in the art to which our invention appertains to make and use the same, we will now proceed to describe its construction and operation, referring to the annexed drawings, in which—

Figure 1:
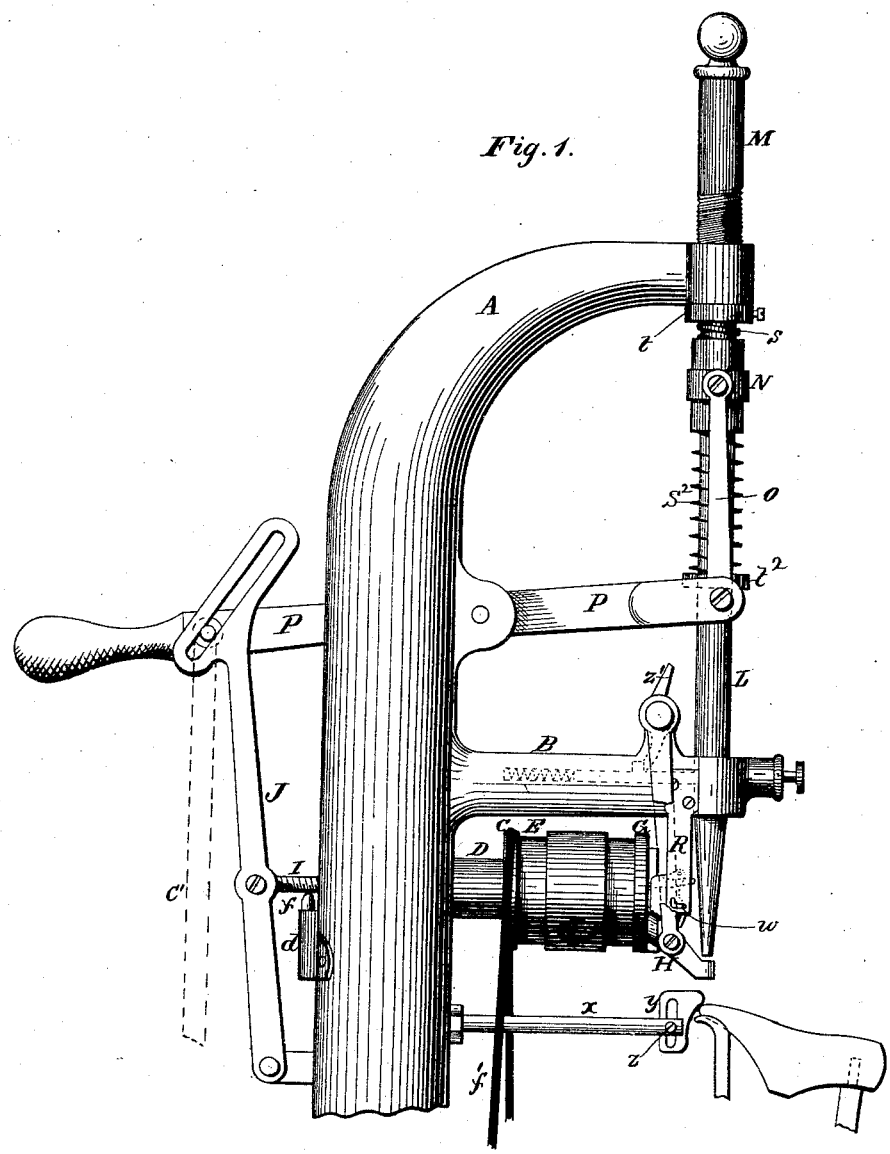
Figure 2:
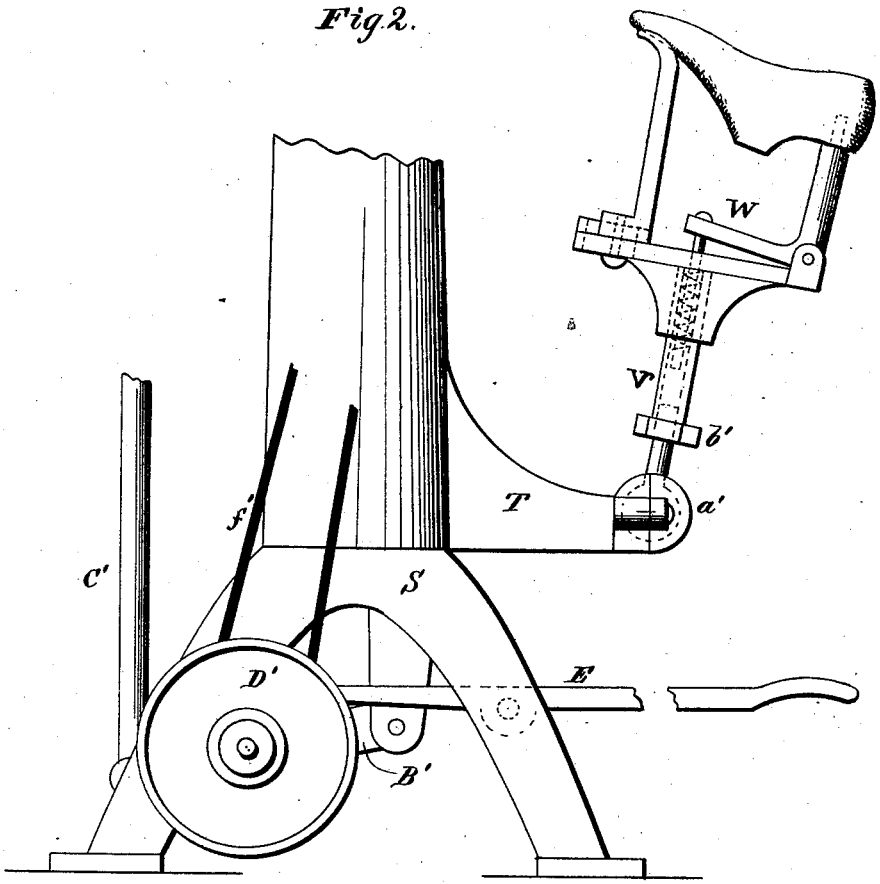
Figure 3:
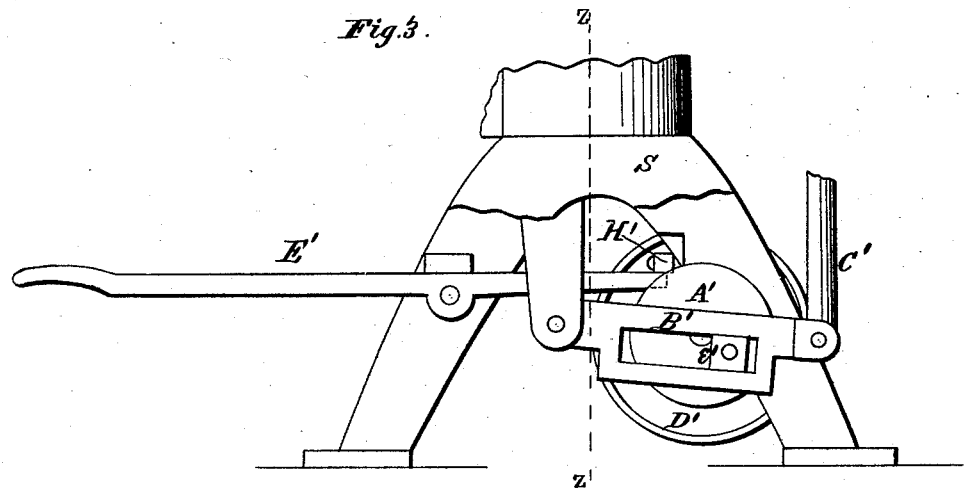
Figure 4:
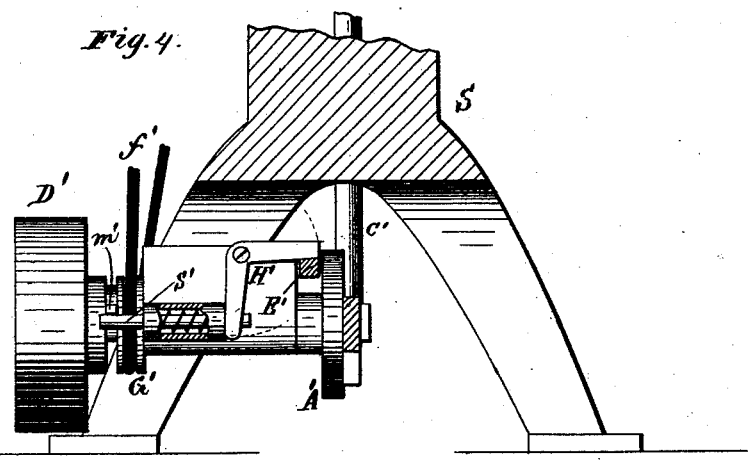
Figure 5:
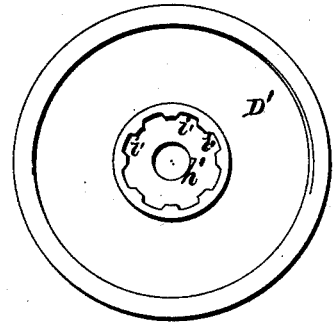
Figure 6:
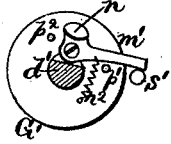

Figure 1 is a side elevation of that part of our machine which contains the entire tack-driving mechanism. Fig. 2 is a side elevation of the bottom part of the machine, containing the devices for holding the last and a clutch-pulley for operating the feeding-cylinder. Fig. 3 is an interior view of said bottom part of the machine. Fig. 4 is a vertical section of the same through the line $z\,z$, Fig. 3. Figs. 5 and 6 are detached views of parts of the clutch-pulley. Fig. 7 is an enlarged longitudinal section through the feeding-cylinder. Fig. 8 shows a part of the feeding device. Fig. 9 is a side view of the stationary head of the cylinder. Fig. 10 is a cross-section of the feeding-cylinder through the line $x\,x$, Fig. 7. Fig. 11 is a front view of the stationary head, showing section through incline H at $y\,y$, Fig. 7. Fig. 12 is a front view of the hammer. Fig. 13 is a side view of the same, partly in section, including the devices immediately connected therewith.

A represents the main standard of the tack-driving mechanism, the upper end of which is curved forward to form the upper bearing for the vertically-operating hammer, the lower bearing for the same being formed in the front end of an arm, B, projecting from the standard. Below this arm B is the feeding-cylinder, composed of a back head, C, with hub D entering a recess in the front of the standard A. From the front of the head C projects the shell E, the front end of which fits over a shoulder on the front stationary head G. This head is secured to the incline H passing through it, which incline is grooved on its upper edge to form the tack-channel $a$. The incline H is composed of several distinct angles, as shown in Fig. 7, the tack-channel running at an angle of about forty-five degrees within the cylinder and through the head G, and at a certain distance from said head the incline and channel are steeper to cause each tack in succession to drop rapidly down to the extreme front end of the channel, which is horizontal. The incline H is, by a rod, I, connected with the cam-arms J, which operate the feeding-cylinder back and forth. The rod I is screwed into the rear end of the incline, and likewise screwed into an oscillating nut, $b$, between the two cam-arms J, whereby said rod is rendered adjustable for the purpose of giving the desired movement of the incline to and from the hammer. On the back of the standard A, below the connecting-rod I, is a vertical tube, $d$, containing a spiral spring, $e$, upon which is placed a pin, $f$, having its upper end beveled on both sides to form an edge, which is held by the spring against and across the screw-threads on the rod I, and forms a "rattler" for the purpose of imparting a jarring motion to the incline, thereby causing the tacks to slide down the same to the separator. The stationary head G is funnel-shaped on the inside of the cylinder E for the purpose of preventing the tacks choking up the outlet of the incline, and for carrying back to the rear of the feeding-cylinder surplus tacks, to be again raised by the buckets or wings $g$ on the inside of the cylinder preparatory to being dropped on the apron that feeds the incline. At a suitable point in the tack-channel $a$ of the incline H is a spring-pin, $i$, on each side, as shown in Fig. 11, for the purpose of arresting the downward movement of the tacks at such point prior to their separation. The inner ends of these pins are beveled or pointed to allow the tacks, when moved by the feeding device, to force them outward and pass them. The incline H is made of any non-magnetic material, and at the point where the separation of the tacks takes place a hardened seat, $h$, is inlaid into the incline, upon which seat the under part of the tack-heads slide while being separated.

We have shown the seat $h$ made of hardened steel; but we may use any material in its construction that is harder than Swedish iron, of which shoe-tacks are made.

K represents the feeding device, in the front end of which is a hardened-steel pointer, $k$, forced downward by a spiral spring, $l$. This pointer is used as the medium for holding and moving each tack by its pressure upon the head of the same, and may be made of any material suitable for the purpose. At the foot or termination of the incline H is formed a recess or cup, $m$, as shown in Fig. 9, for the purpose of stopping, holding, and presenting the tack to the hammer.

In a slot in the stationary head G, within the cylinder E, is pivoted a brush, $n$, held by a spring, $n^1$, as shown in Fig. 10. Upon the inside of the cylinder E are pins $n^2$, which, as the cylinder revolves, strike the upper end of the brush, and turn it to one side, the spring $n^1$ at once returning it to its former position. The brush $n$ thus sweeps back and forth immediately at or above the outlet of the incline H for the purpose of keeping the track free from obstructions. The track-channel $a$ in the incline H, at or near the rear end, extends through to the bottom, and is larger underneath than at the top, as shown in Fig. 10, for the purpose of permitting false or imperfect tacks to drop out and prevent clogging up. L represents the hammer, the upper end of which extends up into an adjustable screw-sleeve, M, fastened in the upper end of the standard A. In this sleeve is a spiral spring, $p$, which is placed and compressed upon the top of the hammer for the purpose of increasing or diminishing the distance between the head of the tack in the presentation-cup at foot of incline and point of hammer which receives the same, and also for the purpose of doing away with the concussion consequent upon the return stroke of the hammer when the machine is running at high speed. N represents a loose sleeve surrounding the hammer L, to which sleeve are attached the rods O, connecting it with the operating-lever P. Within this sleeve is a spiral spring, $s$, against which an adjustable collar, $t$, on the hammer, strikes at the down-stroke thereof. This spring operates as a cushion to relieve the machine from the jar of the downward stroke, and elevates the hammer in advance of the regular movement of the parts, and also compresses the spring $p$ on top of the hammer in advance of the regular movement of the parts. Below the sleeve N is another spiral spring, $s^2$, adjusted by a collar, $t^2$, for increasing or diminishing the force of the blow imparted to the hammer. The three springs $p$, $s$, and $s^2$ thus operate in conjunction to regulate the hammer and make the machine run easy. The steel-pointer $k$ is attached or placed in a pivoted plate, $k'$, in the feeding device K', which plate has a pin, $v$, entering a slot, $w$, in an arm, R. This slot is made in such a manner as to operate the pointer or separator to cause the tacks to slide down the incline to the receiver $m$ on the backward movement of the cylinder.

The feeding device also acts as a guard to prevent tacks from moving out of position consequent upon the jar caused to the machine by blows from a hammer in the hands of the operator while fitting the upper for receiving tacks.

In the standard A, below the feeding-cylinder, is a horizontal screw-rod, $x$, forked or slotted at its outer end to receive a slotted plate, $y$, adjusted up and down by means of a screw, $z$. This plate acts as a guide or rest for the purpose of enabling the operator to drive tacks at any desired distance from the outer edge of the last. S represents the base of the machine, provided with a projecting arm, T, in the end of which is formed a ball-and-socket joint, $a'$, for connecting the rod V, that supports the jack W for holding the last. In the rod V is a slip-joint at $b'$ for raising and lowering the jack. The jack W is the well-known Bailey's jack, patented July 29, 1856. In the base S, in suitable bearings, is a shaft, $d'$, upon the inner end of which is a wheel, A', provided with a crank-pin, $e'$. This crank-pin works in a slotted lever, B', pivoted at one end to a post in the base, and to the other end is pivoted a rod, C', which connects with the lever P for operating the same. On the outer end of the shaft $d'$ is placed the band-wheel D', to which the power is connected. This wheel is placed loosely on the shaft, and is, by a peculiarly-arranged clutch, connected with a pulley, G', which connects, by a belt, $f'$, with the head C of the feeding-cylinder. In the hub of the wheel D' is formed a circular recess, $h'$, concentric with the wheel, and within the same is a series of notches, $i'$, as shown in Fig. 5. On the side of the pulley G' is pivoted an arm, $m'$, provided with a cam-shaped projection, $n^1$, which is to enter the notches $i'$. This arm is held by a spring, $n^2$, against a pin or stop, $p^1$, when the clutch is in gear. If, however, the arm $m'$ is raised from this pin to and against a pin, $p^2$, the projection $n^1$ will be moved out of the notch $i'$, throwing it out of gear. On the side of the boxing for the shaft $d'$ is a tube containing a spring-bolt, $s'$, which extends across the opening between the pulley G' and the hub of the wheel D', and forms a stop for the arm $m'$ to lift it from the pin $p^1$ and throw it out of gear. By means of a treadle, E', and elbow-lever H', the bolt S' is drawn back, when the spring $n^2$ at once throws the clutch in gear again.

By this device an intermittent motion may be given to the feeding-cylinder, and the tacks fed on the incline only when the machine is operated for presenting tacks to the hammer.

The operation of this machine is substantially the same as described in another application for patent heretofore filed.

By the downward movement of the rear end of the operating-lever P the hammer L is raised and caught by a spring-bolt in the arm B of the frame. At the same time the feeding-cylinder is, by the cam-levers J, moved forward, presenting a tack in the cup $m$ to the hammer, which tack is instantly drawn to it by the magnetic influence of the hammer. At the upward stroke of the rear end of the lever P the feeding-cylinder is drawn backward, during which movement the steel pointer $k$ draws or pushes one tack beyond the spring-pins $i\ i$, which held it, so as to slide down the incline into the cup $m$, to be presented to the hammer at the next forward movement of the cylinder. As the front end of the lever P descends, it releases the hammer L, and this is by the spring $p$ thrown forcibly downward to force the tack into the boot or shoe, and the hammer is instantaneously raised a certain distance by the action of the spring $s$ within the sleeve N. The feeding-cylinder in this case is revolved by the belt $f'$, as above described, and the last is held by the operator close up against the guide or rest $y$, the operator having his foot upon the treadle $E'$.

To stop the movements of the machine, the operator has only to remove his foot from said treadle, as above described.

Having thus fully described my invention, what I claim as new, and desire to secure by Letters Patent, is—

1. In a tack-driving machine, an adjustable rod, I, in combination with the incline H and cam-levers J, substantially as and for the purpose herein set forth.

2. In a tack-driving machine, the rattler $f$, in combination with the rod I, for the purposes herein set forth.

3. The stationary head G of the feeding-cylinder C E, made funnel-shaped within said cylinder, for the purposes herein set forth.

4. One or more spring-pins, $i$, arranged in the incline of a tack-driving machine, for the purposes herein set forth.

5. In a tack-driving machine, a hardened seat, $h$, inlaid into a non-magnetic incline, for the purposes herein set forth.

6. In a tack-driving machine, a hardened pointer, K, for holding and moving each tack, as specified.

7. In a tack-driving machine, the recess or cup $m$ at the foot of the vibrating incline H, and forming a part of the same, substantially as shown, and for the purpose specified.

8. The combination, with the stationary head G and incline H, of feeding device and arm R, substantially as shown, all arranged and operating so as to cause the tacks to slide down the incline to a receiver on the backward movement of the cylinder.

9. In a tack-driving machine, the combination of the clutch-pulley $G'$ and belt $f'$ and head C, substantially as shown and described, whereby tacks are fed upon an incline, when the machine is operated, for presenting the tacks to the hammer.

10. The wheel $D'$, with recess $h'$ and notches $i'$, in combination with the pulley $G'$, arm $m'$, with projection $n^1$, spring $n^2$, and stops $p^1\ p^2$, all substantially as and for the purposes herein set forth.

11. In a tack-driving machine, a guide, $x\ y\ z$, having an outer edge curved to overcome the irregularity existing in the different parts of the last, thereby enabling the operator to drive tacks through the upper at an equal distance from the inner sole throughout the shoe, substantially as shown and described.

12. The sleeve N, with spring $s$ within the same, in combination with the hammer used for driving tacks, substantially as and for the purposes herein set forth.

13. In a tack-driving machine, the combination of spiral spring $p$ on top of hammer with spiral spring $s$, when used in sleeve of hammer, substantially as herein set forth.

14. In a tack-driving machine, the combination of the spring $s$, sleeve N, collar $t$, and hammer L with the sleeve M and spring $p$, all arranged and operating to compress spring $p$ in advance of the regular movement of the parts, substantially as herein set forth.

15. The combination, with the stationary head G and revolving cylinder E, of the pivoted brush $n$, spring $n^1$, and pins $n^2$, all constructed substantially as and for the purposes herein set forth.

16. The combination of spiral springs $p\ s$ and $s^2$, applied to a hammer for driving tacks, for the purpose of accomplishing the different functions herein set forth.

In testimony that we claim the foregoing as our invention we hereunto affix our signatures this 23d day of June, 1874.

HENRY G. THOMPSON.
B. F. BERGH.

Witnesses:
FRANK L. ALLIS,
ALBERT A. BALDWIN.